United States Patent [19] [11] 3,940,257
Sherwin et al. [45] Feb. 24, 1976

[54] SOIL CONDITIONING FERTILIZER COMPOUND

[75] Inventors: Ian M. Sherwin; John R. Grubbe, both of Victoria, Canada

[73] Assignee: American Forest Industries Ltd., Victoria, Canada

[22] Filed: Sept. 23, 1970

[21] Appl. No.: 74,867

Related U.S. Application Data

[63] Continuation-in-part of Ser. No. 688,023, Dec. 5, 1967, abandoned.

[52] U.S. Cl. ................ 71/23; 71/24; 71/64 SC; 71/64 G; 71/64 DC
[51] Int. Cl.² ................ C05F 11/00; C05F 11/02
[58] Field of Search ........... 49/9; 71/23, 24, 64 G, 71/64 SC; 99/159; 426/332

[56] References Cited
UNITED STATES PATENTS

| | | | |
|---|---|---|---|
| 103,085 | 5/1870 | Ruggles | 71/23 X |
| 460,861 | 10/1891 | Gillihan et al. | 99/154 |
| 806,976 | 12/1905 | Inskeep | 99/154 |
| 1,228,587 | 6/1917 | Nash | 71/23 X |
| 2,070,658 | 2/1937 | Hartenstein | 71/23 X |
| 2,550,261 | 4/1951 | Jensen | 99/139 |
| 2,974,030 | 3/1961 | Geary | 47/9 UX |
| 3,140,921 | 7/1964 | Barrow | 71/23 X |
| 3,561,943 | 2/1971 | Gay et al. | 71/23 |

*Primary Examiner*—Thomas G. Wyse
*Assistant Examiner*—Ferris H. Lander
*Attorney, Agent, or Firm*—Seed, Berry, Vernon & Baynham

[57] ABSTRACT

A soil conditioning and fertilizer composition and the process of producing it is disclosed, the composition composed of particulate seaweed intimately mixed with particulate tree bark.

2 Claims, No Drawings

SOIL CONDITIONING FERTILIZER COMPOUND

This application is a continuation-in-part of our earlier filed application, Ser. No. 688,023, filed Dec. 5, 1967 and now abandoned.

This invention relates to a soil conditioning and fertilizing compound, and one, more especially, which contains seaweed, and preferably raw seaweed, in its composition. Seaweeds (a term which is inclusive of sundry sea plants) have been long known to contain ingredients which are especially valuable in the fertilization of soil. Seaweeds also contain wetting agents — the so-called mucilaginous colloids — such as carrageenin, agar and algin. In addition to these colloids, colloidal solutions which serve to reduce evaporation are formed from polysaccharides and other sugars present in seaweeds. Seaweeds of course contain an extraordinary number of trace elements which are extremely valuable in the fertilization of soil and which are not readily available in any other source.

One problem in the use of seaweeds for conditioning and fertilizing soil is that raw seaweed, which is to say seaweed in the natural state, is relatively unpleasant to handle and it develops a very obnoxious odor upon being exposed to air. Moreover, there is an application problem, to wit: difficulty in obtaining an even distribution. This is because seaweed should not be haphazardly applied. Seaweed becomes self-defeating as a soil conditioner and fertilizer when more than a small quantity is used for each square yard of treated ground surface. Studies by various authorities, using seaweed concentrates, that is raw seaweed from which substantially all of the water has been removed, show that the greatest benefits are obtained when 2 ounces are used per square yard treated. Other authorities, principally German, maintain that under certain conditions no more than one-half ounce of concentrate should be used per square yard treated. The discovery that the beneficial effect of a seaweed extract is greatest at high dilution is a fairly recent discovery, and has been attributed to the auxins contained in seaweeds. Auxins, hormonal in nature, are considered to perform the following functions with plant life:

1. Increase growth rate.
2. Increase assimilation of minerals.
3. Reduce check from heat and cold.
4. Promote resistance to fungus and disease and attack by aphids.

Our own extensive experiments, largely conducted with raw seaweed, bear out the above findings. Raw seaweed, i.e. seaweed in the natural state, appears to achieve the greatest benefit when applied in the amount of 20 ounces per square yard of treated soil surface. Being approximately 90% water, this quantity of raw seaweed is perforce equivalent to 2 ounces of seaweeed concentrate.

In order to effectively apply natural seaweed in this small amount to an area of soil, and bearing in mind that there are special soil conditions in which the maximum effect from treatment with seaweed is achieved by the use of as little as 1 ounce of natural seaweed per square yard of soil surface, the matter of obtaining a uniform distribution is of controlling import. Our answer thereto is to mix the seaweed with a carrier which is large in bulk by comparison with that of the seaweed, one which is itself a material which will condition and fertilize the soil, which will mix advantageously both physically and chemically with the seaweed, and which will produce a product pleasant to the touch and one easy to apply to the soil. Fir, hemlock or other suitable tree barks are ideal for the purpose, preferably with the water content which customarily is present in barks procured from coastal sawmill logs.

The seaweed and tree bark are intimately mixed in a proportion determined by the thickness to which the product is to be spread, say 1 part by weight of the natural seaweed to 10 parts by weight of the fibrous carrier, and this mixture is pulverized, ground, crushed or otherwise impacted so that the content of seaweed is uniform throughout the mixture and its juices caused to wet and enter the fibrous material. The product obtained is pleasant to the touch and easy to spread upon the soil, having a feel and appearance not unlike pipe tobacco.

The process of the present invention is presently being performed by metering, quantitatively in accordance with the prescribed ratio, continual flows of natural seaweed and tree bark from separate hoppers onto respective conveyor feed belts. The tree bark when supplied to its hopper is fresh from the mill and hence has been reduced to bits and small pieces typical of the output from a log barker, and issues from the hopper in accurately measured volume. The seaweed likewise issues from its hopper in small pieces accurately metered. The seaweed and bark are delivered from the feed belts onto a common mix conveyor, first the bark and then the seaweed being deposited thereon from overhead delivery points in a manner to accomplish a relatively uniform distribution of the seaweed through the bark. The intermixed bark and seaweed either feeds directly from the mix conveyor to a pulverizer, or may first be fed to an intervening charging hopper, and from the pulverizer is packed into bags for shipment to the consumer.

For maximum clarity in an understanding of the invention it is thought desirable to here reiterate that by reason of its hormonal nature, seaweed can inhibit rather than promote plant growth where more than a small amount of the auxin content is available to the soil. Again reiterating, our findings are that 20 ounces per square yard of soil surface area represents very nearly a ceiling level for optimum results. This is not to say that a heavier concentration will damage plant life. It is only that such heavier concentration can inhibit growth and thus becomes self-defeating if the looked-for results are those for which soil conditioners and fertilizers are usually applied. The tree bark which is mixed with the seaweed is itself beneficial to a degree as a conditioning and fertilizing agent. Used as a mulch in ordinary flower beds a depth of 1.2 inches is usually prescribed. A composition in the proportion of 10 to 1, weight considered, fir bark to natural seaweed is optimum for normal mulch use in that it supplies approximately 20 ounces of natural seaweed per square yard of surface area when spread to a depth of 1.2 inches. Should it be desired to provide 2 inches or more mulch usually prescribed, say, for a rose bed, the composition should be proportioned 20 to 1. Where lawns are treated, a depth in excess of one-half inch is not desirable in that it would bury the lawn. In this application the mix is fortified by doubling the seaweed content. However, owing to the high water content a mulch containing much in excess of 10% by weight of raw seaweed adversely affects the physical character of the mulch. It is not as easily spread and also gives rise to unpleasant oder and excessive mold formation. While the odor and mold is not undesirable from a fertilizer point of view it is from an aesthetic aspect. To meet this problem, fortified mix maintains the same 10 to 1 ratio between tree bark and raw seaweed but augments the seaweed by inclusion of water-free concentrate. This is to say, for a ½ inch mulch, bark fiber, raw seaweed, and seaweed concentrate are in the proportion of 100–10–1.

The wetting agents contained in seaweed and hereinbefore referred to give to the fibers of the tree bark an ability to absorb, hold and conduct water during the prolonged period required for the tree bark to decompose. Tree barks have natural nutrient value which is released to the earth as the decay progresses. Bark in finely ground condition forms a "host" for soil bacteria. Decay of the bark releases nutrients that provide an environment for a certain spectrum of soil bacterial activity triggered by the seaweed. The combination of tree bark and seaweed interacts both chemically and physically to release its components in a fashion compatible and inter-related to the action of the seaweed.

It is here pointed out that seaweed is a very complex organic product and the closer it is kept in its natural state during processing, handling, and storage prior to the actual use of the compound the greater is the assurance that there will be provided in the soil an environment best able to promote the growth of soil bacteria. Natural preservatives in tree bark—the most important of which are a series of natural organic polymers—hold the seaweed in very near a natural state until the bark is combined with soil. When so combined, the polymers start to decay. Unlike artificial preservatives such as a formaldehyde, heretofore rather widely used to keep seaweed in a stable form, the preservative effect of bark ceases when the compound is put to use, making both the bark and the seaweed free to promote growth of soil bacteria. The wider the spectrum of soil bacteria which can be generated, the greater is the likelihood that the greatest possible variety of the minerals present will be broken down to form plant food. Formaldehyde has the particular disadvantage that a soil environment does not reduce its bacteria-inhibiting characteristic.

The preservative effect peculiar to tree barks is not obtained from peatmoss. Peatmoss has the capacity to absorb seaweed juices, albeit in a much less degree than tree barks. There is also some lessening of odor by the use of peatmoss although in a degree considerably below that which is obtained from tree barks.

To enlarge somewhat upon one of the above-mentioned advantages inherent to the mulch of the present invention, namely that its seaweeed content inhibits the growth of organisms inimical to germinants, it is here pointed out that the propensity for these organisms to be stimulated by nitrogen has heretofore deterred substantial use of nitrogen fertilizers in the raising of nursery stock even though nitrogen is probably the most important plant nutrient. With Douglas-fir seedlings, for example a case has been made that an increase of nitrogen from 30 to 90 pounds per acre treated causes a significant drop in the germination of the seedlings. One of today's major costs in the logging industry is reforestation, and seedling survival is hence of paramount importance. The matter of providing adequate nitrogen without thereby stimulating organisms which are inimical to plant growth is a problem which of course applies to most plants and certainly all trees and shrubs. Tests so far conducted give persuasive evidence that the present invention answers the problem. Nitrogen can be applied safely in fairly large amounts where there is a conjunctive application to the seaweed mulch.

Pure sand was mixed with 25% by volume of the following materials: (1) particulate tree bark and particulate seaweed prepared as described previously, (2) sawdust treated such that it would not decay rapidly and then treated to add nitrogen, (3) peatmoss alone, and (4) sawdust alone. Grass seed of the type used in preparation of golf course putting greens was sowed in the four compositions. The composition of this invention referred to as (1) produced young turf with the best color, density and growth rate. The composition (2) ranked second and the compositions (3 and 4) were poorest of the four compositions tested. Despite the fact that the composition (1) contained virtually no nitrogen it out performed composition (2) to which nitrogen had been added in an unexpected way, indicating that the addition of a nutrient such as nitrogen to a basically inert carrier such as sawdust (composition 2) produced results not comparable to the combination of particulate tree bark and seaweed of composition (1).

It is thought that the invention will have been clearly understood from the foregoing description. It is our intention that no limitations be implied and that the hereto annexed claims be given the broadest interpretation to which the language fairly admits.

The embodiments of the invention in which an exclusive property or privilege is claimed are defined as follows:

1. The method of combining particulate raw seaweed and particulate tree bark to produce a soil conditioning and fertilizing composition comprising;
    providing particulate raw seaweed,
    providing particulate tree bark,
    mixing the particulate seaweed and tree bark in a weight ratio of 10 parts tree bark to no more than about 1 part seaweed to assure uniform distribution of the seaweed throughout the bark, and
    pulverizing the mixture to reduce the composition to particulate form and to cause the juices of the seaweed to wet the fibers of the tree bark.

2. The method of claim 1 wherein the mixing is performed by delivering by conveyor metered quantities of the bark and seaweed to a common hopper.

* * * * *